United States Patent
Mitra

(10) Patent No.: US 9,938,152 B2
(45) Date of Patent: Apr. 10, 2018

(54) METHOD OF MAKING ACTIVATED NANO-POROUS CARBON

(71) Applicant: Farad Power, Inc., Sunnyvale, CA (US)

(72) Inventor: Shantanu Mitra, Hillsborough, CA (US)

(73) Assignee: Farad Power, Inc., Sunnyvale (*) Notice: Subject to any disclaimer, the term of this patent is extended or adjusted under 35 U.S.C. 154(b) by 14 days.

(21) Appl. No.: 15/242,113

(22) Filed: Aug. 19, 2016

(65) Prior Publication Data
US 2016/0355402 A1 Dec. 8, 2016

Related U.S. Application Data

(63) Continuation-in-part of application No. 14/341,725, filed on Jul. 25, 2014, now Pat. No. 9,458,021.

(51) Int. Cl.
| | |
|---|---|
| *C01B 31/08* | (2006.01) |
| *B01J 20/20* | (2006.01) |
| *B01J 20/30* | (2006.01) |
| *B01J 20/28* | (2006.01) |
| *H01G 11/34* | (2013.01) |
| *H01G 11/36* | (2013.01) |
| *C01B 32/318* | (2017.01) |
| *H01G 11/86* | (2013.01) |
| *H01M 4/587* | (2010.01) |
| *C01B 32/30* | (2017.01) |
| *C01B 32/366* | (2017.01) |
| *C01B 32/336* | (2017.01) |
| *C01B 32/342* | (2017.01) |
| *C02F 1/28* | (2006.01) |

(52) U.S. Cl.
CPC ............ *C01B 31/086* (2013.01); *B01J 20/20* (2013.01); *B01J 20/2808* (2013.01); *B01J 20/3078* (2013.01); *B01J 20/3085* (2013.01); *C01B 32/30* (2017.08); *C01B 32/318* (2017.08); *C01B 32/336* (2017.08); *C01B 32/342* (2017.08); *C01B 32/366* (2017.08); *H01G 11/34* (2013.01); *H01G 11/36* (2013.01); *H01G 11/86* (2013.01); *H01M 4/587* (2013.01); *C01P 2006/16* (2013.01); *C01P 2006/40* (2013.01); *C02F 1/283* (2013.01); *Y02C 10/08* (2013.01); *Y02E 60/13* (2013.01)

(58) Field of Classification Search
CPC .......................... C01B 32/318; C01B 32/336
See application file for complete search history.

(56) References Cited

U.S. PATENT DOCUMENTS

| | | | | |
|---|---|---|---|---|
| 5,744,510 | A * | 4/1998 | Pekala | C01B 32/00 264/29.1 |
| 7,887,771 | B2 | 2/2011 | Sun et al. | |
| 8,057,774 | B2 | 11/2011 | Kim et al. | |
| 8,480,930 | B2 * | 7/2013 | Suh | B01J 13/0091 252/502 |
| 8,865,617 | B2 * | 10/2014 | Matsumoto | A61K 33/44 502/416 |
| 2009/0213529 | A1 | 8/2009 | Gogotsi et al. | |
| 2012/0148473 | A1 | 6/2012 | Kramarenko | |
| 2015/0030525 | A1 | 1/2015 | Mitra | |

FOREIGN PATENT DOCUMENTS

| | | |
|---|---|---|
| IN | 201617015427 | 5/2016 |
| WO | WO2015058113 | 4/2015 |

OTHER PUBLICATIONS

Roop Chand Bansal et.al., Surface groups of carbon black, Carbon Black Science and Technology, 1993, 175-179, usa.
Pandolfo, A. G., et al.,Conductive Additives and Inter-Particle Voids in Carbon EDLC Electrodes, http://www.acs.omnibooksonline.com/data/papers/2007_A031.
Pandolfo, A. G., et al., TheInfluenceofConductiveAdditives and Inter-ParticleVoidsinCarbonEDLC Electrodes,Fuel Cells 10(5), (2010), 856-864].
Wang, G., et al., Flexible Pillared Graphene-Paper Electrodes for High-Performance Electrochemical Supercapacitors,Small, 8(3), 2012:452-459].
Olivares-Marin, M. et al., Preparation of activated carbon from cherry stones by chemical activation with ZnCl2, Applied Surface Science 252(17), (2006) 5967-5971].
Evans, M.J.B., et al., The production of chemically-activated carbon,Carbon, 37(2), (1999), 269-274].
Benaddi, H. et al., Surface functionality of activated carbons obtained from chemical activation of wood,Carbon, 38 (2000) 669-674].
Brunauer, S., et al., Adsorption of Gases in Multimolecular Layers, Journal of the American Chemical Society, (1938), 60 (2): 309-319.
Christopher L. Burket et. al., Genesis of porosity in polyfurfuryl alcohol derived nanoporous carbon, Carbon 2006,44 (2006) 2957-2963.
Anthony J. R. Rennie et.al., Influence of Particle Size Distribution on the Performance of Ionic Liquid-based Electrochemical Double Layer Capacitors, Nature, 2016,Feb. 25.

* cited by examiner

*Primary Examiner* — Stuart Hendrickson
(74) *Attorney, Agent, or Firm* — Geeta Kadambi; Riddhi IP LLC

(57) ABSTRACT

An activated nano-porous carbon is produced using a liquid organic compound as a starting material. A combination of the liquid organic compound with organic acids is mixed with conductive carbon powder and polymerized. The polymerized material is then carbonized and activated using physical or chemical methods. The activated nano-porous carbon obtained using this method has been used to fabricate EDLC devices. The carbon has also shown large surface area (up to ~2000 m2/gm, depending on the degree of activation) and can be used for various other activated carbon applications.

18 Claims, 5 Drawing Sheets

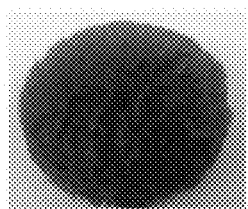 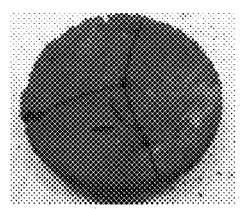
Figure 1a          Figure 1b
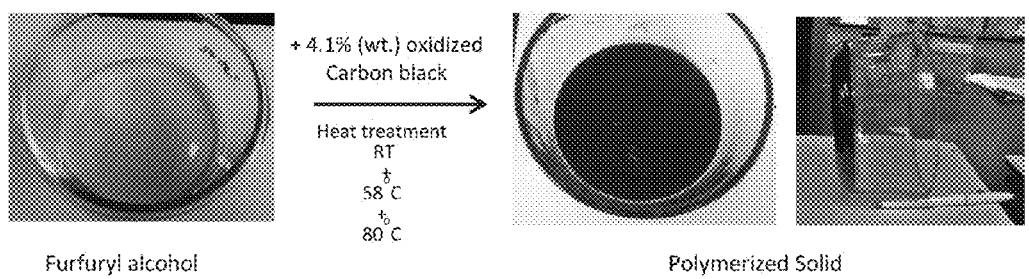
Figure 2 a) Furfuryl alcohol with dissolved organic acids b) After adding carbon black and solid formation at room temperature.

c) After polymerization is complete – showing interfaces of the bulk carbon.

METHOD OF MAKING ACTIVATED NANO-POROUS CARBON

CROSS-REFERENCE TO RELATED APPLICATIONS

This application is a continuation in part of and claims the benefit of Indian Patent Application 201617015427 filed on May 3, 2016, and U.S. application Ser. No. 14/341,725 filed on 25 Jun. 2014 and the contents of which are incorporated in their entirety.

FIELD OF TECHNOLOGY

This disclosure generally relates to a method of making an activated nano-porous carbon.

BACKGROUND

Activated carbon is in wide use today and is currently produced from a number of different sources like coal, coconut-shell, wood, etc. Of these, coconut-shell based activated carbon has found extensive use in high-end applications like electric double layer capacitors (EDLC) due to its higher density, high specific surface area, and suitable pore size distributions. Typical coconut-shell based activated carbon in commercial use today for EDLCs has a specific surface area around 1600 $m^2$/gm, densities in the 0.4 gm/cc range, pore sizes of <1 nanometer and pore volumes around 0.7 $cm^3$/gm (e.g. for the YP-50 brand). Also, when naturally occurring substances like coconut-shell and coal are used as starting materials for activated carbon manufacturing, there is typically little control over the purity of the starting materials. This results in substantial purification efforts being needed during manufacturing, to bring impurity levels of commonly occurring elements like Fe, S, Cl, etc., —that have deleterious effects on specialized applications like EDLCs—to acceptable levels (<50 ppm). Recently, we have described a process to synthesize activated carbon from pure starting materials like furfuryl alcohol and acetylfuran (US patent publication US20150030525). These synthetic materials are inherently purer than naturally occurring coconut-shell char and are thus attractive starting materials for these high-end applications, when processed into nano-porous, high-surface area activated carbon.

Several approaches to manufacturing nano-porous activated carbon from synthetic sources have been described using the templating approach. In one embodiment that used an external or so-called 'hard template' (U.S. Pat. No. 7,887,771), a fine powder of silica was dispersed within a precursor organic compound, which was then polymerized in the presence of other catalysts and cross linking agents to form a solid, from which the template was etched away leaving behind the porous carbon. In another embodiment, metal carbides were used, from which the metal ions were etched away leaving behind a porous carbon structure (US patent application publication US20090213529 and US patent application publication US20120148473). Other examples include polymerizing different starting materials in the presence of templates, which were then removed by spray pyrolysis methods (U.S. Pat. No. 8,057,774). While these techniques allow for control of pore size in the final carbon to varying degrees—depending on the size and distribution of the original templating particles—they require a much more involved and expensive manufacturing procedure compared to coconut-shell activated carbon, which is still in widespread use.

In our recently described method for manufacturing nano-porous activated carbon we polymerized furfuryl-functional-group containing organic compounds (e.g. Furfuryl Alcohol, Furfural, Acetylfuran, etc.) in the presence of strongly acidic inorganic catalysts like silane, $TiCl_4$ etc., (US patent application publication US20150030525). After solidification and carbonization, the catalysts ended up leaving a residue of Si or Ti-containing materials that had to be etched away. Following this, further processed using industry-standard activation techniques resulted in the necessary pore sizes (<1 nm) and surfaces areas suitable for EDLC applications. In another method [EPO publication WO2015058113], we describe the use of an external template (e.g. alumina), which itself has acidic properties, to polymerize the same furfuryl-functional-group containing compounds. In that case, no other catalysts or cross-linking agents are required. Similar to the previous embodiment, this produced a carbonaceous material that could be further processed using standard industry practice (e.g. $CO_2$ or steam activation) to create the nano-porous carbon, after the external template of alumina was etched away.

Both these methods involving polymerization of furfuryl alcohol have some advantages over the existing coconut-shell process (e.g. purer starting materials) and the templating approach (e.g. simpler manufacturing process due to fewer starting materials). But etching is still required. Thus, improvements are desired and methods using the same starting materials, but with even fewer manufacturing steps, are attractive. There is a need to find a more efficient method of making nano-porous carbon.

SUMMARY

The current method builds upon our earlier methods (US patent publication US20150030525; EPO publication WO2015058113) by describing a technique that uses organic acid catalysts (containing only C, H and O) which do not leave any templates or residue after polymerizing and heat treatment—thereby not requiring any etching. This represents a significant improvement in the manufacturing process by eliminating a costly etching step.

Accordingly, one aspect of the current method to synthesize a nano-porous carbon by mixing a furfuryl-functional-group containing precursor liquid with a polymerization catalyst that is an organic acid powder soluble in the carbon precursor liquid, along with a conductive carbon powder. The mixture is then: a) polymerized between room temperature to elevated temperature of 200° C. to obtain a dense solid; b) carbonized by heating the resulting solid, to drive out decomposition products and volatile organic compounds (VOCs); and, c) activated using industry standard methods to create the nano-porous carbon.

In one embodiment, a method of producing an activated nano-porous carbon is described that comprises of the following steps:

a) mixing a liquid organic compound, wherein the liquid organic compound is at least one of a furfuryl-functional-group compound, with an organic acid catalyst and an additive to make a mixture; b) heating the mixture to make a solid polymerized material; c) carbonizing the solid polymerized material by heating at a controlled temperature to drive out all the volatile compounds to form a carbonized material; and d) activating the carbonized material in a controlled environment to form the activated nano-porous carbon to be used in an electric double layer capacitor electrode, liquid and gas phase filtration, purification and storage applications.

Furthermore to the above step an organic solvent is added to the liquid organic compound before it is mixed with the organic acid catalyst, wherein the organic solvent is an acetone. Yet another step is activating using heat under a controlled environment, wherein the controlled environment includes one of a gas, an acid, a strong base and a salt. Wherein the gas is at least one of a carbon dioxide, nitrogen, argon and steam; wherein the acid is at least one of a phosphoric acid and similar acids; wherein the base is at least one of a potassium hydroxide and similar bases; wherein the salt is at least one of a zinc chloride and similar salts.

Another aspect involves using a combination of organic acids, all soluble in the precursor carbon liquid, along with the conductive carbon additives, to catalyze the polymerization reaction. The polymerized solid is then subjected to the same steps as described in the previous aspect, i.e. carbonization and activation. In another aspect, mixing a liquid organic compound, wherein the liquid organic compound is at least one of a furfuryl-functional-group compound, with an additive, wherein the additive is a carbon black, to make a mixture. In another embodiment, carbonizing and activating are performed together in a controlled environment, wherein the controlled environment is a gas, wherein the gas is at least one of a nitrogen, argon, carbon dioxide and steam.

Yet another aspect of the variation provides a method that uses only carbon black to polymerize the same furfuryl-functional-group containing starting materials. Subsequent processing is the same, namely, carbonization and activation. The conductive carbon additives remain embedded in the final activated nano-porous carbon and contribute to the properties of the final product when used in EDLC applications.

Other objects of the invention may be apparent to one skilled in the art upon reading the following specification and claims.

BRIEF DESCRIPTION OF THE DRAWINGS

Example embodiments are illustrated by way of example and not limitation in the Figures of the accompanying drawings, in which like references indicate similar elements and in which:

FIG. 1(a) shows a polymerized solid obtained from a furfuryl alcohol, oxalic acid and carbon black mixture, but with high concentrations that produced a rapid reaction and a porous, low-density solid with a very rough surface. FIG. 1(b) shows a polymerized solid from the same starting materials with lower catalyst concentrations, resulting in a more controlled reaction and a denser solid with smooth surfaces.

FIG. 2 shows the progression of a polymerization reaction utilizing furfuryl alcohol and carbon black only. Heat treatments at 58° C. and 80° C. were performed and shows a pasty solid that holds it shape after 80° C. treatment.

FIG. 3(a) is from a sample that was partially polymerized at room temperature before TGA, while FIG. 3(b) is from a sample with the same combination of starting materials, but polymerized up to 200° C. for several hours before TGA.

FIG. 5 step (c) shows the interfaces of the polymerized solid, which appear uniform and without any obvious morphological changes between the top and bottom of the polymerized mass.

FIGS. 6(a) and 6(b) are consistent with performance obtained from commercially sourced carbon and show the feasibility of using the methods described in this description for EDLC applications.

Figure 3A:
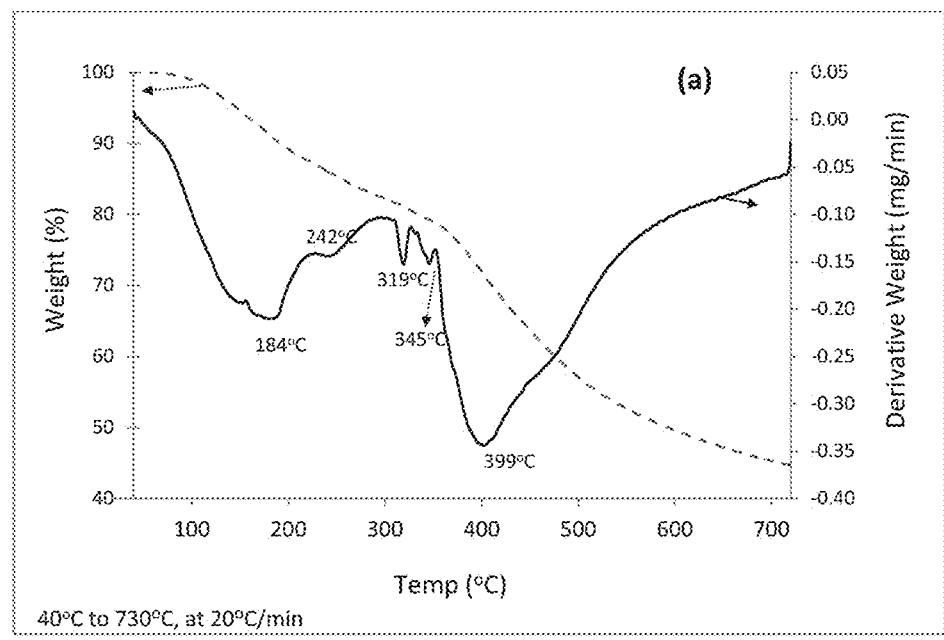
FIGS. 3a and 3b shows derivative weight loss (mg./min) versus temperature (° C.) (solid line), and % weight loss versus temperature (° C.) (dashed line) for two samples of furfuryl alcohol/organic acids/carbon black combinations, measured using thermal gravimetric analysis (TGA).

Other features of the present embodiments will be apparent from the accompanying drawings and from the detailed description that follows.

DETAILED DESCRIPTION

This application describes the method of making a nano porous carbon to manufacture activated nano porous carbon that can be used for EDLC and other applications. No etching process is used to make nano-porous carbon. It is also to be understood that the terminology used herein is for the purpose of describing particular embodiments only, and is not intended to be limiting, since the scope of the present application will be limited only by the appended claims and their equivalents.

Specific embodiments of the methods described in this disclosure that were reduced to practice and presented here, are targeted at EDLC since their requirements (purity, surface area, pore size, high electrical conductivity) are the most stringent of the wide range of activated carbon applications. These carbons can also be used for a number of other applications. For many gas-phase applications, like purification and separation of gases, gas masks, automotive emissions control and odor removal in air conditioning systems, the key requirement is a high surface area. Other applications like water purification applications and hemoperfusion also require high purity, while for the removal of salt from sea-water, high electrical conductivity is also a crucial requirement. Carbons synthesized using the methods of this description have shown very high surface areas of ~2000 m$^2$/gm.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present application, the preferred methods and materials are now described.

The instant method may be carried out in three main steps with slight variations in ingredients and temperature manipulations in each step and requiring no etching step. Namely; a) mixing the liquid organic precursor starting materials with catalysts and additives in the appropriate ratios and heating them to get a dense polymerized solid; b) Carbonizing the polymerized materials; and c) activating the carbonized materials.

Mixing and Polymerization step: For this step, the liquid carbon precursor starting materials used to carry out the method are furfuryl-functional-group containing organic liquids. These include furfuryl alcohol ($C_5H_6O_2$), furfuraldehyde ($C_5H_4O_2$), 5-hydroxymethylfurfural ($C_6H_6O_3$) and 5-methylfurfural ($C_6H_6O_2$). In one embodiment the organic acids are at least one of an oxalic acid, tartaric acid, maleic acid, benzoic acid and citric acid. These acids can be used individually or in combination with other acids in the group.

In US patent publication (US20150030525) we have described a method to control the polymerization of furfuryl alcohol (which is cationic by nature) by diluting the reactants with organic solvents like acetone when strong catalysts like silane were used. This is important since low concentrations of silane resulted in fast uncontrolled polymerization reactions caused by thermal runaway if not cooled properly, producing a low-density unusable solid. Since the carbon precursors are the same in this method, acetone may also be used to control the reaction in the current system, especially when higher concentrations of the organic acids are used or when volumes are scaled up and the exothermic reaction can potentially outpace the efficiency of heat removal from the system.

In one embodiment, the method can be carried out by adding conductive carbon powders like carbon black to the organic-acid/furfuryl-functional-group compound mixtures, before polymerization. Carbon black is also known to exhibit some acidic characteristics, which can be increased by oxidizing it at temperatures up to 400° C. (Bansal, R., et al., 1993). This acidic nature of carbon black can help with the polymerization of the furfuryl alcohol. Consequently, we have also subjected carbon black to oxidation treatments before adding it to the organic-acid/furfuryl-functional-group compound starting materials.

Since the carbon black remains embedded in the polymerized material and undergoes the subsequent carbonization and activation treatments, the right concentration of carbon black in the starting materials can eliminate the need to add conductive carbon to the final activated carbon during EDLC electrode manufacturing. While we have investigated the use of carbon black, in particular, due to its preponderant use in EDLC electrode manufacturing, other forms of conductive carbons like graphene, lignin, and some carbon nanotubes could also be substituted for similar effect. However, the addition of carbon black or other conductive carbons is not critical for other activated carbon applications like filtration, gas storage, etc.

The main conditions that control the mixing and polymerization step of the method are: a) the concentration of catalysts and additives; b) the polymerization conditions (room and elevated temperatures); c) the polymerization environment.

Concentration of catalysts and additives during polymerization: Of the group of organic acids investigated, oxalic acid is the strongest—with the lowest pKa (dissociation constant). We have used oxalic acid (#75688, anhydrous, >99%, from Sigma Aldrich, St. Louis, Mo.) in various concentrations, along with carbon black (C-NERGY C-45, from Imerys, Willebroek, Belgium), to identify the appropriate concentration of the catalyst needed to polymerize furfuryl alcohol. The oxalic acid powder was mixed into the furfuryl alcohol and stirred for at least 30 mins using an overhead stirrer. Carbon black powder was added after this and stirred again for an additional 30 minutes. The mixture was then allowed to stand at room temperature for several hours, with a cover to minimize evaporation loss. Following this, the material was heated at 58° C. for up to 24 hours. Table 1 shows the results of polymerization of furfuryl alcohol with different concentrations of oxalic acid. An 18% concentration of oxalic acid, by itself is clearly too large, as it resulted in a rapid uncontrolled polymerization reaction after 3 hours at room temperature. This rapid reaction led to the formation of an unusable porous mass with low density. Moreover, it is not a reproducible reaction and thus not useful for industrial manufacturing. Even with a lower oxalic acid concentration (13%, line 2) and 2.7% carbon black (as-manufactured), a rapid reaction occurred when soaked at slightly elevated temperatures (58° C.). Concentrations of oxalic acid of 9% and 4% (by wt.) worked well, but in general required higher hold times.

TABLE 1

Results of polymerization of furfuryl alcohol with organic acids:

| # | Furfuryl Alcohol (FA)(gms) | Oxalic Acid (OA)(gm) | Ratio of OA/FA | Carbon Black (CB) (gm) | Ratio of CB/FA | Room temp (Hrs.) | Soaked @ 58° C. (Hrs.) | Result |
|---|---|---|---|---|---|---|---|---|
| 1 | 113 | 20 | 18% | 0 | 0.0% | 3 | — | Very fast reaction = less dense solid |
| 2 | 56.5 | 7.5 | 13% | 1.5 | 2.7% | 24 | 0.5 | Very fast reaction = less dense solid |
| 3 | 56.5 | 5 | 9% | 1.5 | 2.7% | 72 | 22 | Dense Solid |
| 4 | 113 | 4.86 | 4% | 3 | 2.7% | 96 | 24 | Dense Solid |

Based on the data presented in Table 1, we have used a general guideline of ~9% (by weight) for the organic acid ratio and ~2.7% (by weight) for the carbon black ratio (when they are both used in combination) to obtain a dense polymerized solid material from a reproducible polymerization reaction. When using oxalic acid by itself (without carbon black), controlled polymerization reactions can also be obtained with weight ratios higher than 9% (but less than 18%). If other organic acids are used by themselves or in combination with each other, but without carbon black, this ratio can even be even higher, since oxalic acid has the lowest pKa of the group.

Examples of the physical appearance of a low-density and high-density polymerized solid are shown in FIGS. 1a and 1b. The solid in FIG. 1(a) resulted from the conditions described in #2 of Table 1, while FIG. 1(b) resulted from the conditions in # 3. Density of the polymerized solids shown in FIG. 1(a) and FIG. 1(b) was measured to be 0.76 gm/cc and 1.06 gm/cc, respectively. These densities were measured on the as-polymerized solids, and their values will decrease as the material is further processed to the final activated nano-porous carbon powder. Consequently, controlled and reproducible polymerization reactions are important during this step of the method to produce as dense a starting solid as possible.

Another aspect of this method is that a combination of organic acids (from the group described earlier) can be used to achieve similar results. We have investigated combinations of oxalic acid, tartaric acid and maleic acid. With the guideline established above, we have mixed these organic acids in molar ratios of 1:1:1, with a resulting weight ratio of 8.8% (compared to the weight of the starting furfuryl alcohol), along with a carbon black ratio of 2.7% (compared to the weight of the starting furfuryl alcohol). Since the other acids are weaker than oxalic acid, one could potentially increase the amounts of tartaric and maleic acids to achieve similar dense polymerized solids.

We have also investigated the use of carbon black alone, as a potential catalyst for the polymerization of the furfuryl-functional-group compounds. In particular, we have mixed furfuryl alcohol with different combinations of carbon black times. FIG. 2 shows the combination #3 (oxidized 4.1% carbon black), before and after the heat treatment described above. Although the other 2 combinations were still viscous liquids after 45 hours at 80° C., the 4.1% regular carbon-black combination eventually became a pasty mass after an additional 72 hours at 80° C., while the 2% carbon-black mixture did not, even after an additional 146 hours. We further cured combination #3 at room temperature for an additional 500 hours to create a hard dense solid that could be further processed to make activated carbon. This further processing involved heating up to 200° C. in atmosphere, followed by a 600° C. carbonization treatment (under nitrogen) and a $CO_2$ activation step at 950° C.—resulting in activated carbon. Similar room temperature curing on combinations # 1 & 2 did not however, result in dense solids that could be further processed to make activated carbon—indicating that a higher percentage of carbon black (greater than 4%, by weight) and a higher level of oxidation (greater than 1 hour at 350° C.) of the carbon black are required to fully polymerize furfuryl alcohol, when carbon black is used by itself. This particular embodiment of the method (only carbon black and the furfuryl-functional group compounds) is especially attractive for high-end applications like EDLC electrodes since it eliminates all other catalysts, cross-linking agents, additives, surfactants, templates, etc., resulting in a simple and cost-effective process that doesn't need any expensive washing and etching steps.

TABLE 2

Carbon black concentrations variation:

| # | Carbon black/ Furfuryl alcohol | CB pre-treatment | Heat treatment | Result | Heat treatment | Result |
|---|---|---|---|---|---|---|
| 1 | 2% | As-received | RT: ~24 hrs. 58° C.: ~24 hrs. | Liquid | 80° C.: ~45 hrs. | Viscous liquid |
| 2 | 4.1% | As-received | RT: ~24 hrs. 58° C.: ~24 hrs. | Viscous liquid | 80° C.: ~45 hrs. | Very viscous liquid |
| 3 | 4.1% | 350° C./1 hr./ air | RT: ~24 hrs. 58° C.: ~24 hrs. | Very viscous liquid | 80° C.: ~45 hrs. | Pasty solid | and cured it at room temperature and slightly elevated temperatures, to evaluate the conditions required for obtaining an initial polymerized dense solid that can be further treated. We used a 2% (by weight) and two 4.1% (by weight) combinations of carbon black in furfuryl alcohol, with the carbon black of one of the 4.1% mixtures being partially oxidized to increase its acidic nature (Bansal, R., et al., 1993). The carbon black (C-NERGY, C-45 from Imerys, Willebroek, Belgium) was heated it in a Thermolyne, 1300 muffle furnace for 1 hour at 350° C. under air. Thermal gravimetric analysis (TGA) of different carbon blacks under air have shown insignificant weight loss up to around 400° C., with large weight changes appearing from ~600° C. onwards till the entire mass is consumed by around 725° C. This resulted in our choice of 350° C. as the oxidation temperature for carbon black.

All three combinations of carbon black (shown in Table 2) were individually mixed and stirred at room temperature for at least 30 minutes, before soaking at room temperature for 24 hours, followed by 58° C. for 24 hours and 80° C. for 45 hours, all under atmosphere. The 4.1% oxidized carbon black version resulted in a pasty mass that held its shape when its container was inverted, indicating some degree of polymerization at these concentrations, temperatures and Polymerization conditions of furfuryl alcohol/organic acid/conductive additive systems: Since furfuryl alcohol polymerizes with a strong exothermic reaction and has a boiling point of 170° C., directly heating the furfuryl-alcohol-containing liquid mixture can result in uncontrolled reactions and/or excessive evaporation before polymerization. The method was thus carried out by first holding the mixture for several hours at room temperature to obtain a pasty solid that represented a partially polymerized material before any heat-treatment was undertaken. The overall length of time at room temperature was dictated by measuring the weight loss of the mixture over time. After the rate of weight loss approached zero and a pasty solid formed, the material was heated to elevated temperatures and again held for several hours. This was done in multiple stages, at intermediate temperatures of 40° C., 80° C., 120° C. and 200° C., in one embodiment of the method. Different combinations of intermediate temperatures were also used in other embodiments, but up to a maximum of 200° C. Once again, weight loss versus time was measured at each of these temperatures before moving to the next higher temperature. In another embodiment, we have eliminated the 40° C. and 80° C. treatments, going directly from room temperature to 120° C. and 200° C.

To evaluate the validity of the polymerization temperature range (room temperature to ~200° C.), we have used thermal gravimetric analysis (TGA) on two samples of materials polymerized using the methods of this invention. Specifically, furfuryl alcohol was mixed with a combination of oxalic acid, tartaric acid and maleic acid (molar ratios of 1:1:1, with a total organic acid weight ratio to furfuryl alcohol of 8.8%) along with carbon black (2.7% weight ratio) and cured at room temperature while monitoring the weight loss. After a pasty solid mass was obtained at room temperature (material was partially polymerized and maintained its shape when its container was inverted), it was used for TGA. Additionally, another sample with the same starting composition was taken through the following heat treatment regimen—several hours at room temperature to obtain the same shape-retaining pasty mass followed by heat treatment at 40° C., 80° C., 120° C., and 200° C., before being analyzed by TGA.

Figure 3B:
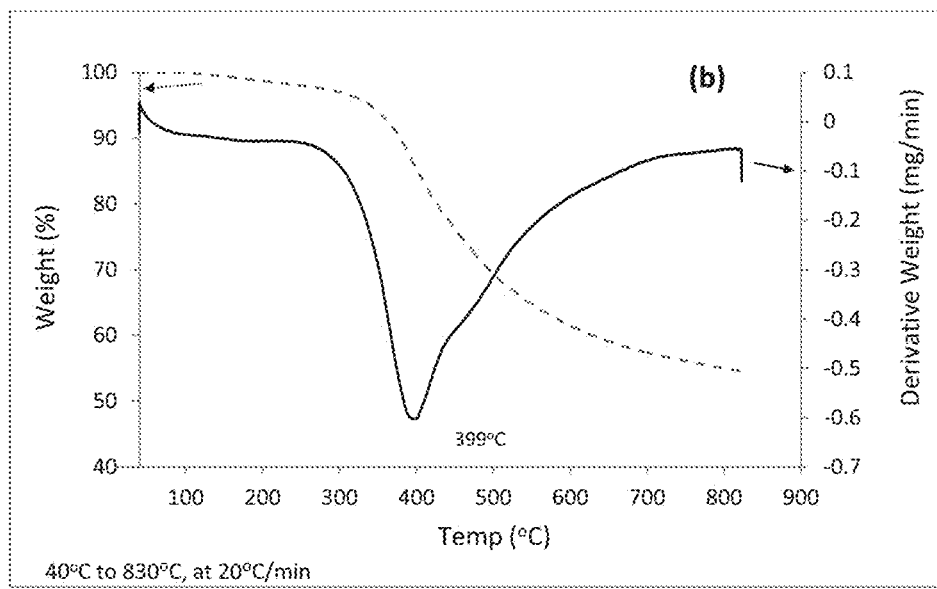

The TGA studies were carried out on a PerkinElmer Thermal Analysis system (Model STA 6000) under air. The results are shown in FIGS. 3(a) and 3(b). FIG. 3(a) shows the weight loss and differential weight loss plots of the room-temperature treated sample, while FIG. 3(b) corresponds to the 200° C. treated sample, when heated from 40° C. to ~800° C. at a rate of 20° C. per minute. The differential weight loss (mg/min) peaks in FIG. 3(a) are located at 184° C., 242° C., 319° C., 345° C. and 399° C. The 184° C. peak likely corresponds to the evaporation of un-polymerized furfuryl alcohol (boiling point of furfuryl alcohol is 170° C.). The other peaks (242° C., 319° C., 345° C.) are polymerization-reaction related, since the 399° C. peak also appears in FIG. 3(b), which was already heated to 200° C. before TGA. The common 399° C. peak corresponds to the volatile organic compounds being released. This was confirmed during our subsequent carbonizations treatments where we saw extensive outgassing around 400° C., and by other studies (Burket, C. 2006) that used a different polymerization catalyst with furfuryl alcohol and found VOCs being released between 350° C. and 450° C. Based on the absence of any lower-temperature peaks in the TGA data of FIG. 3(b), we conclude that heating up to 200° C. is effective in polymerizing this system. Consequently, this method utilizes a temperature range up to ~200° C. for the heat treatments described in this section.

Polymerization environment: Another aspect of the method deals with the potential formation of a skin or crust on the liquid starting materials after mixing and during holding at room temperature. This skin forms at the air/liquid interface and can interfere with the polymerization of the bulk material underneath. Based on the particular combination of catalysts and starting materials in some cases, long soak times are required at room temperature (when using low concentrations of organic acids). During these times, regular stirring of the mixture was carried out—as required—to break up any skin that formed.

Carbonization step: Once a dense solid is obtained from the polymerization step, further heat treatment is required to carbonize the polymer and remove the volatile organic compounds. As seen from FIG. 3(b), decomposition and weight loss continues up to ~800° C., although the majority of the weight loss appears to be accomplished by ~600° C. Consequently, this method utilizes a carbonization treatment that involves heating up to around 800° C. under an inert atmosphere (e.g. nitrogen). In another embodiment of this method, the carbonization step is performed in two stages. The first stage is carried out at a lower temperature and under atmospheric conditions, with the second stage under nitrogen, and up to the final temperature of around 800° C. For the first stage, temperatures should not exceed around 400° C., as the material will start decomposing beyond that temperature.

Activation Step: The resulting carbonized material can now be activated using industry-standard activation methods. With physical activation (for example with $CO_2$), the carbon is heated between around 800 and 1100° C., with $CO_2$ flowing through for up to several hours (depending on the temperature and the level of burn-off desired in the final activated carbon material). Industrial practice favors fluidized-bed steam activation which generally requires lower temperatures (e.g. 800° C. to 900° C.) and shorter soak-times than $CO_2$ activation, to achieve similar activation yields. We have used $CO_2$ activation of a static bed of carbonized material in a quartz tube furnace operating at 950° C. under flowing $CO_2$, gas in all the examples presented here. A typical activation profile used to carry out the method with $CO_2$ activation using this setup involved heating the carbonized material up to 950° C. (under nitrogen) at a rate of 15 to 20° C./min; then soaking it at 950° C. under flowing $CO_2$, at a rate of 3.4 liters per minute for the required time, and cooling under nitrogen (at the natural cooling rate). Using this activation technique we have obtained high surface-area activated carbon, with measurements in the 2000 $m_2$/gm range. Additionally, chemical activation techniques can also be used to activate the carbonized material produced by this method. For example, zinc chloride activation (Olivares-Marin, M. et al., 2006) potassium hydroxide (Evans, M. J. B., et al., 1999) and phosphoric acid (Benaddi, H. et al., 2000) are well established processes for activating carbon.

The activated carbon material is now ready for jet milling or similar particle-size reduction techniques—depending on the end application. Since the EDLC application likely represents the most stringent of applications, we have used carbons made by the methods described here to fabricate EDLC devices and test them, with the understanding that if our methods are suitable for EDLCs then other applications are also feasible. Most commercial applications for EDLC electrodes utilize a sub-10 micron average particle size that is obtained using fluidized-bed jet milling techniques. However, in the examples presented below, we have not used these types of particle-size reduction techniques. Rather we have used simple mechanical grinding—without accurate control over particle size—to construct EDLCs, with good results.

Example 1

Figure 4:
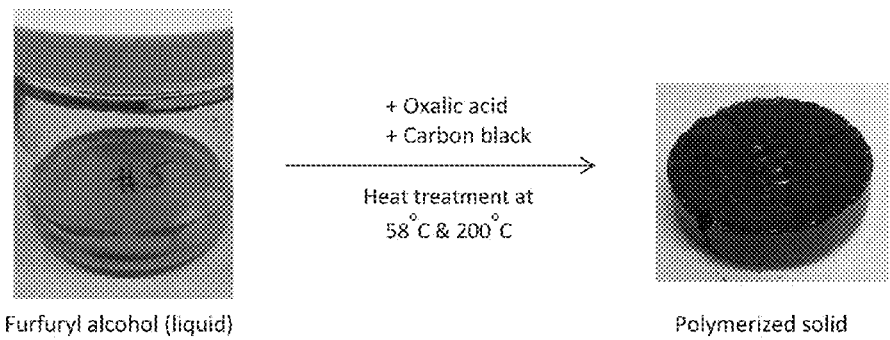
FIG. 4 shows the progression of the polymerization reaction from furfuryl alcohol starting material to dense solid; when using 8.8% oxalic acid (by weight, compared to furfuryl alcohol), 2.7% carbon black (by weight, compared to furfuryl alcohol), and treating at 58° C. and 200° C.

In this embodiment of the method, 56.5 gms of furfuryl alcohol (#W249106, >=98%, from Sigma Aldrich, St. Louis, Mo.) was stirred for 30 minutes in a glass jar. Stirring was performed using an overhead stirrer operating at around 200 rpm. Next, 5 gms of oxalic acid (#75688, anhydrous, ≥99.0%, from Sigma Aldrich, St. Louis, Mo.)—representing a weight ratio of 8.8%—was then added over a period of 1 minute, and stirring was continued for another 30 minutes. At this point, the solution was allowed to stand at room temperature for several hours before 1.5 gms of carbon black (C-NERGY SUPER C45 from Imerys, Willebroek, Belgium) was added to the solution and stirred for another 30 minutes. The mixture was then allowed to stand at room temperature until it formed a pasty solid that held its shape when the container was tilted. Next, the material was placed in an oven at 58° C. under atmosphere and under atmosphere until it formed a solid that could be handled. The weight loss of the material over the total 58° C. treatment was measured to be 5.2%. The partially polymerized solid was then treated at 200° C. under atmosphere, resulting in a dense solid. FIG. 4 shows the final polymerized material after the 200° C. treatment. At this stage the material is ready for carbonization and activation.

Example 2

Figure 5:
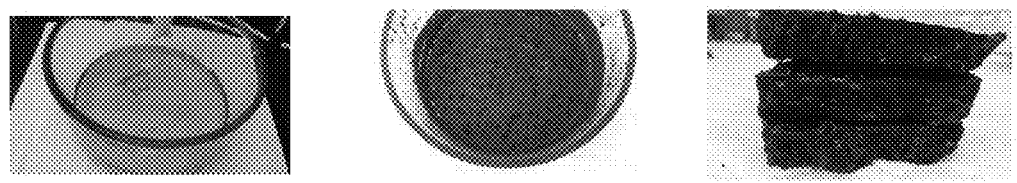
FIG. 5 shows the progression of the polymerization reaction from step (a) furfuryl alcohol starting material to step (b) solid formation at room temperature, to step (c) dense solid after 200° C. treatment; when using 8.8% organic acid combination (by weight); 2.7% carbon black (by weight), and treating at room temperature, 40° C., 80° C., 120° C. and 200° C.

In this embodiment 150 ml of Furfuryl alcohol (#249106, >=98%, from Sigma Aldrich, St. Louis, Mo.) was stirred for 30 mins, using the same set up described earlier. Next, a mixture of organic acids comprising: i) Oxalic acid=3.8 gms (#75688, anhydrous, ≥99.0%, from Sigma Aldrich St. Louis, Mo.), ii) Maleic acid=4.9 gms (#M0375, ≥99.0% (HPLC), from Sigma Aldrich St. Louis, Mo.), and iii) L-(+)-Tartaric acid=6.3 gms (#T109, ≥99.5%, from Sigma Aldrich St. Louis, Mo.) was added and stirring was continued for another 45 minutes. At this point 75 ml of acetone (HPLC grade) was added to the solution and stirred for another 15 minutes. The mixture was allowed to stand at room temperature for several hours. Next, 4.5 gms of carbon black (C-NERGY SUPER C45 from Imerys, Willebroek, Belgium) was added and the mixture stirred for an additional 135 minutes. It was then allowed to cure at room temperature, under atmosphere. During this time it was periodically and manually stirred to break up any skin formation at the air/liquid interface. It was then subjected to heat treatments at 40° C., 80° C., 120° C. and 200° C., all under atmosphere, to create a dense solid. FIGS. 5a, 5b, and 5c shows the progression from FIG. 5a liquid starting material (furfuryl alcohol at room temperature), to FIG. 5b after room temperature soaking, to FIG. 5c after formation of polymerized solid, showing the interfaces inside the bulk material after it was broken into smaller pieces. The interfaces in FIG. 5c appeared uniform, with no significant differences between the top and bottom of the polymerized material.

Next, the polymerized material was prepared for carbonization at 800° C. Carbonization was done in two steps: i) soaking at an intermediate temperature (360° C.) under regular atmosphere, and ii) soaking at 800° C. under nitrogen. No special conditions are needed for both these heating steps, other than the inert atmosphere for the higher temperature process. As expected, outgassing was observed during the initial heating stage, with the maximum occurring around 350° C. to 400° C. The carbonized material was then pulverized into smaller particles in a mortar and pestle, resulting in particle sizes in the 2 mm (and below) range. Carbon samples were then loaded onto quartz boats (10 cm long by 4 cm wide) that were placed in a quartz tube vacuum furnace for $CO_2$ activation (model GSL-1100X, MTI Corporation, Richmond, Calif.). Activation was performed at 950° C. with $CO_2$ flowing through the tube at 3.4 liters/min Two samples with different activation yields were generated in this example by varying the length of time the carbon was exposed to the flowing $CO_2$. Thus, we processed a 61% yield sample (i.e. a weight loss or burn-off of 39%, compared to the pre-activated carbon weight) and a 35% yield sample (i.e. a burn-off of 65%).

These activated carbon samples were now used to make EDLC electrodes by first grinding them down to an average size of ~20 to 30 microns using a stainless-steel-bladed grinder. Next, TEFLON® powder (PTFE 6C from DuPont Corporation, Wilmington, Del.) was added as a binder, and the mixture was ground again to thoroughly mix the ingredients and produce a dough-like material. Finally, this dough-like material was rolled onto an aluminum sheet (33 microns thick) to form the electrode. CR2032 coin-cell sized electrodes were punched out and fabricated into coin cells using a standard 1M tetraethyl ammonium tetra fluoroborate/Acetonitrile organic electrolyte, commonly used in commercial EDLC manufacturing. Two sets of coin cells were made i) from the 61% yielded activation carbon and ii) the 35% yielded activated carbon.

Figure 6A:
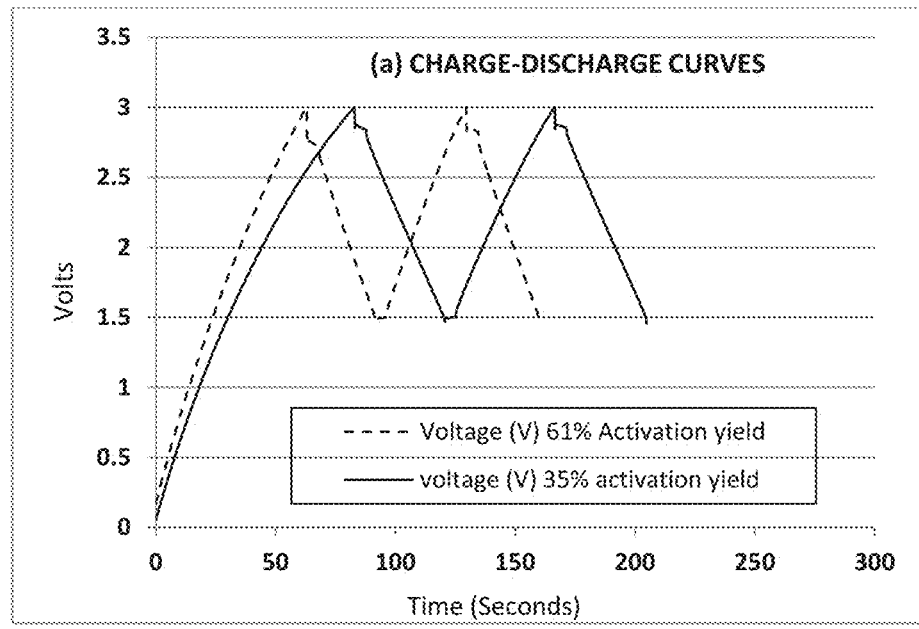
FIGS. 6a and 6b shows representative charge-discharge and self-discharge curves for coin-cells made with the activated carbon synthesized using the process described in example 2. Two levels of carbon activation were used (61% and 35% yield, corresponding to 39% and 65% burn-off during activation). Both
Figure 6B:
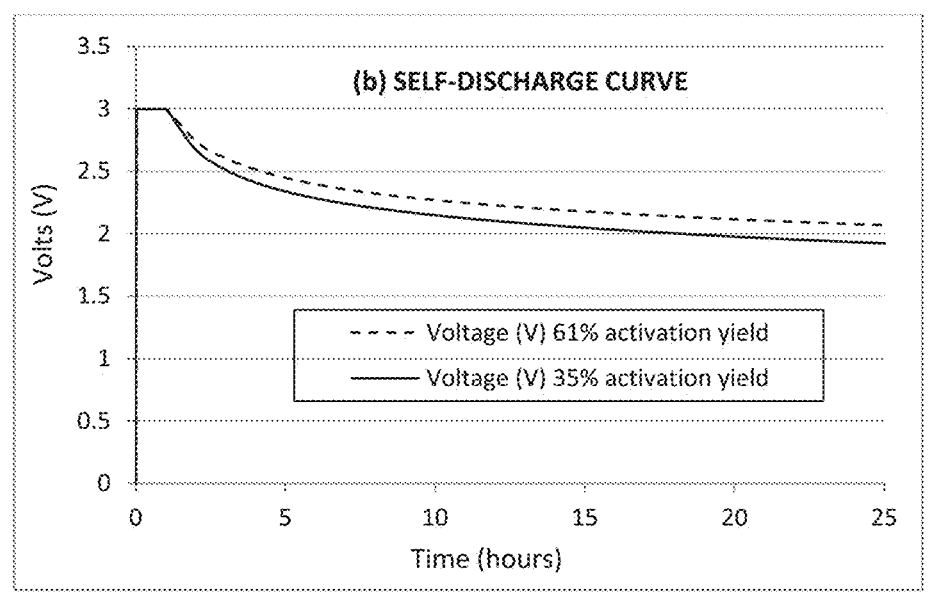

Electrical measurements were made on these cells to verify that the carbon produced by the methods described in this disclosure, is suitable for EDLC applications. Table 3 compares the average specific capacitance of the 2 sets of coin cells. FIG. 6a and FIG. 6b shows the charge-discharge curves and the self-discharge curves of a representative cell from each of the two sets. As expected, the samples with the higher burn-off (lower activation yield) showed better results, as a higher degree of activation is associated with a higher specific surface area. Capacitance values were obtained from the slope of the V(t) curves, namely by dividing the current by the slope of the charging curve (V vs time). The self-discharge plots (measured over a 24 hour period with open circuit) show a drop in the cell voltage of around 34%—consistent with behavior seen from EDLC devices constructed with commercially available activated carbon.

TABLE 3

| Specific capacitance of coin cells: | |
| --- | --- |
| Carbon Type | Specific capacitance (F/g) |
| Example 2, 61% activation yield | 68.1 |
| Example 2, 35% activation yield | 80.3 |

Finally, measurement of the surface area of both sets of activated carbon produced in this example, was done using the BET (Brunauer, Emmett and Teller) method (Brunauer, S., et al., 1938). Measurements were made on a Micromeretics TriStar™ II 3020 instrument, using nitrogen as the adsorptive gas. Nitrogen isotherms were obtained at 77K after the samples were degassed for 1 hour at 90° C., followed by 16 hours at 300° C. The isotherms were fitted to the BET equation to obtain surface area. Total pore volumes were obtained from a point on the isotherm at a relative pressure (P/P0) >0.98. The results are shown in Table 4. As a comparison, Table 4 also includes the surface area and pore volume (measured using the same methods) of a sample of commercially available activated carbon, namely YP-50 from Kuraray Chemical Co., Japan.

TABLE 4

| Surface area and pore size of the commercial carbon: | | |
| --- | --- | --- |
| Carbon Type | BET surface area (m2/gm) | Pore volume (cm3/gm) |
| Example 2, 61% activation yield | 1194.56 | 0.574 |
| Example 2, 35% activation yield | 1576.42 | 0.939 |
| YP-50 (Kuraray Chemical Co.) | 1611.31 | 0.747 |

Example 3

This embodiment is similar to example 2, but with differences in the polymerization and carbonization steps. Similar amounts of furfuryl alcohol and organic acids were used. The acid powders were added to the furfuryl alcohol and stirred for 120 minutes. The solution was allowed to sit at room temperature for several hours followed by the addition of 4.5 gm of carbon black powder and continued stirring (no acetone was added in this example). Once the rate of weight loss of the material approached zero, it was then subjected to heat treatments at 87° C., 110° C. and 198° C. (under atmosphere) to make the polymerized solid. The lower temperature 40° C. step, from the previous example has been eliminated here.

Next, the polymerized material was carbonized at 600° C. This was also done in two steps: i) soaking at 360° C. under atmosphere, and ii) soaking at 600° C. under nitrogen. The carbonized material was again pulverized into smaller particles in a mortar and pestle, resulting in particle sizes in the 2 mm (and below) range. The material was then placed in a quartz tube vacuum furnace for $CO_2$ activation. Activation was performed at 950° C., with $CO_2$ flowing through the tube at 3.4 liters/min, until 29.7% of the pre-activation weight was achieved. The activation may also be done by heating under controlled atmosphere using at least one of a carbon dioxide, nitrogen or steam. Once again, CR2032-sized coin-cells were made using the same technique described in example 2. Electrical measurements were also made on the cells (results shown in Table 5, along with typical specific capacitance values associated with EDLCs made with commercially available activated carbon). Charge-discharge and self-discharge curves for these EDLC samples were similar to those shown earlier and are not reproduced here. BET measurements of surface area and pore volume were also made and the results are shown Table 6, which also includes data from commercially available YP-50 activated carbon (measured on the same instrument as our activated carbon). These results show that the method of making activated carbon described in this method can result in surface areas comparable with commercially available activated carbon and is also suitable for making EDLC devices.

TABLE 5

Capacitance comparison:

| Carbon Type | Specific capacitance (F/g) |
| --- | --- |
| Example 3, 29.7% activation yield | 86.2 |
| Typical commercially available carbon | ~100 |

TABLE 6

YP-50 activated carbon compared to instant activated nano porous carbon.

| Carbon Type | BET surface area (m2/gm) | Pore volume (cm3/gm) |
| --- | --- | --- |
| Example 3, 29.7% activation yield | 1686.29 | 0.984 |
| YP-50 (Kuraray Chemical Co.) | 1611.31 | 0.747 |

Example 4

This embodiment is also similar to example 2, but utilizes different temperatures during the polymerization and carbonization steps. Similar amounts of furfuryl alcohol and organic acids were used. The acid powders were added to the furfuryl alcohol and stirred for 150 minutes. The solution was allowed to sit at room temperature for several hours followed by the addition of 4.5 gm of carbon black powder and was stirred for another 2.3 hours (no acetone was added in this example). Next, the mixture was held at room temperature, and following the point at which no significant further weight loss was seen over time, was subjected to additional heat treatment at 110° C. and 193° C., under atmosphere, to make the polymerized solid. The lower temperature steps of 40° C. and 80° C., used in example 2, were skipped in this example.

The polymerized material was then carbonized by heating it up to 600° C. This was also done in two steps: i) soaking at 360° C. under atmosphere, and ii) soaking at 600° C. under nitrogen. The carbonized material was then pulverized into smaller particles in a mortar and pestle, resulting in sizes in the 2 mm (and below) range. This was then placed in a quartz-tube vacuum furnace for $CO_2$ activation at 950° C. Activation was performed until a final weight of 21.7% of the pre-activation weight was achieved. Once again, CR2032-sized coin-cells were made and tested using the same technique described in example 2. Results of the electrical and BET measurements are shown in Tables 7 and 8. Charge-discharge and self-discharge curves were again consistent with measurements on devices fabricated using commercially available activated carbon, although the specific capacitance appears to be less than the typical value of 100 F/g. This is attributable to the non-optimized processing we have used in our examples (i.e. no fluidized-bed steam activation and jet-milling, as is the case for commercially available activated carbon). It is well known that particle size and size distribution of activated carbon play a role in determining packing density of the electrode sheet, which in turn affects the specific capacitance (Rennie, A. J. R. et al., 2016). Since we have not made any effort to optimize the particle size of our carbons described here, the EDLC results we show here cannot be compared with those from commercially activated carbon that is jet milled and screened (for particle size distribution). The key point however, is that with the methods described here, we have made activated carbon with higher surface area and pore volume than what is commercially used for EDLC applications, keeping in mind that further optimization of the final particle size is required for higher specific capacitance, and is not within the scope of this method disclosure.

TABLE 7

Electrical and BET measurements:

| Carbon Type | Specific capacitance (F/g) |
| --- | --- |
| Example 4, 21.7% activation yield | 83.7 |
| Typical commercially available carbon | ~100 |

TABLE 8

Electrical and BET measurements:

| Carbon Type | BET surface area (m2/gm) | Pore volume (cm3/gm) |
| --- | --- | --- |
| Example 4, 21.7% activation yield | 1941.14 | 1.324 |
| YP-50 (Kuraray Chemical Co.) | 1611.31 | 0.747 |

Figure 7:
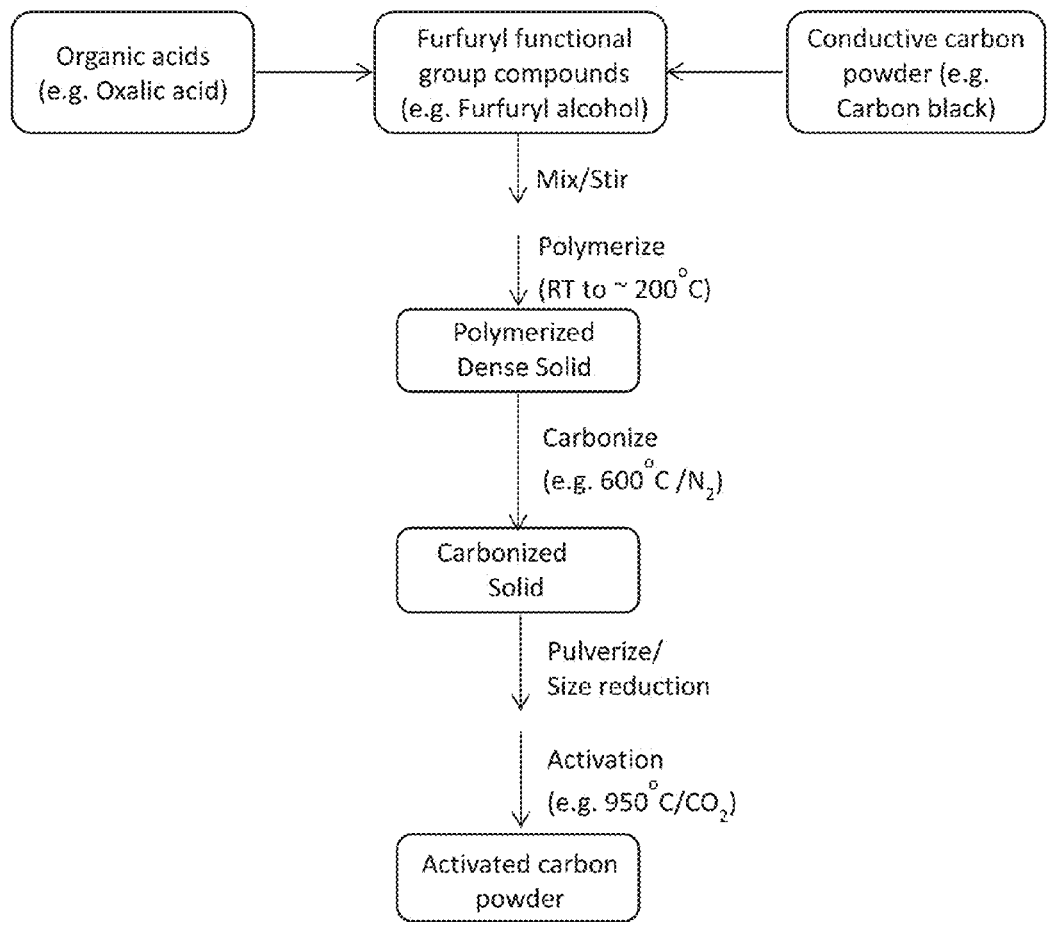
FIG. 7 shows a schematic description of the main process steps utilized in this invention, along with some representative details of materials and processing conditions.

Besides polymerizing furfuryl alcohol (and similar materials) with organic acids and carbon black in combination, we have also shown that we can polymerize the same starting materials with organic acids alone. Additionally, carbon black alone has shown promise with respect to the polymerization process of furfuryl alcohol. Based on the examples, we have summarized the process described in this method, in FIG. 7. The carbon precursor materials (furfuryl alcohol and its related compounds) are mixed with one or more organic acids identified earlier, along with conductive carbon powder like carbon black, and mixed thoroughly. The mixture is then polymerized at elevated temperatures up to ~200° C. Based on the actual temperatures chosen the holding times will vary. Once polymerized, the dense solid that is formed is then carbonized at temperatures up to ~800° C. under an inert atmosphere. The carbonized material is now ready for activation using any number of available techniques, both physical ($CO_2$, steam, etc.) and chemical ($ZnCl_2$, KOH, $H_3PO_4$, etc.). The activation may be done by chemical means utilizing any of a group of acids (like phosphoric acid and similar acids), strong bases (like potassium hydroxide and similar bases) and salts (zinc chloride and similar salts).

We have discussed a number of examples and embodiments of the method and those skilled in the art will recognize that optimizations, modifications, permutations, additions, and sub-combinations can be made to produce similar final results. For example, industrial practice of fluidized bed activation can be used to optimize the final carbon characteristics over what is obtained using the static-bed activation method we have used in our examples.

What is claimed is:

1. A method of producing an activated nano-porous carbon, comprising:
    a) mixing a liquid organic compound, wherein the liquid organic compound is a furan-functional-group compound, with an organic acid catalyst wherein the organic acid catalyst is chosen from a group of organic acids with a pKa equal to or greater than that of oxalic acid and an additive to make a mixture wherein the additive is at least one of a carbon black, graphene, carbon nanotube and lignin;
    b) heating the mixture to make a bulk solid polymerized material;
    c) carbonizing the bulk solid polymerized material by heating at a controlled temperature to form a carbonized material; and
    d) activating the carbonized material in a controlled environment to form the activated nano-porous carbon.

2. The method according to claim 1, wherein the furan functional-group compound is at least one of a furfuryl alcohol, furfuraldehyde, 5-hydroxymethylfurfural and 5-methylfurfural.

3. The method according to claim 1, wherein the organic acid catalyst is at least one of an oxalic acid, tartaric acid, maleic acid, citric acid and benzoic acid.

4. The method according to claim 1, further comprising: adding an organic solvent to the liquid organic compound before it is mixed with the organic acid catalyst, wherein the organic solvent is an acetone.

5. The method according to claim 1, wherein the additive is first partially oxidized at a temperature between 100° C.-400° C.

6. A method according to claim 1, wherein the mixing and polymerization are performed at a specific controlled temperature, wherein the specific controlled temperature ranges between room temperature –200° C.

7. The method according to claim 1, wherein the carbonizing is carried out between 360° C.-800° C.

8. The method according to claim 1, wherein the activating is done by heating under controlled atmosphere wherein the controlled atmosphere is a gas, wherein the gas is at least one of a carbon dioxide and steam.

9. The method according to claim 1, wherein the activating is done by chemical activation methods wherein the chemical activation methods involve heating the carbonized material in the presence of an acid, wherein the acid is $H_3PO_4$, a strong base, wherein the strong base is KOH, or a salt, wherein the salt is $ZnCl_2$.

10. The method of claim 1, wherein the method of making an activated nano-porous carbon does not require an etching step and is suitable for energy storage applications.

11. A method of producing an activated nano-porous carbon, comprising:
    a) mixing a liquid organic compound, wherein the liquid organic compound is a furan functional-group compound, with an additive, wherein the additive is a carbon black, wherein the carbon black is an oxidized carbon black to make a mixture;
    b) heating the mixture to make a bulk solid polymerized material;
    c) carbonizing the bulk solid polymerized material by heating at a controlled temperature to form a carbonized material; and
    d) activating the carbonized material in a controlled environment to form the activated nano-porous carbon.

12. The method according to claim 11, wherein the furan functional-group compound is one or more of a furfuryl alcohol, furfuraldehyde, 5-hydroxymethylfurfural and 5-methylfurfural.

13. The method according to claim 11, wherein the carbon black additive is first partially oxidized at a controlled temperature, wherein the controlled temperature is between 100° C.-400° C.

14. The method according to claim 11, wherein the mixing and polymerization are performed at a controlled temperature, wherein the controlled temperature ranges between room temperature –200° C.

15. The method according to claim 11, wherein the carbonizing is carried out between 360° C.-800° C.

16. The method according to claim 11, wherein the activation is done by heating under controlled temperature with at least one of a carbon dioxide, and steam atmosphere.

17. A method of making an activated nano porous carbon, comprising:
    a) mixing a furfuryl alcohol with an organic solvent, wherein the organic solvent is an acetone, to make a mixture;
    b) adding a combination of organic acids, wherein the organic acids have pKa values greater or equal to that of oxalic acid, and carbon black to the mixture;
    c) heating the mixture to form a bulk solid polymerized material under atmospheric conditions;
    d) heating the bulk solid polymerized material between 600° C.-800° C. to make a carbonized material; and
    e) activating the carbonized material in a controlled environment, wherein the controlled environment is a gas, wherein the gas is at least one of a carbon dioxide and steam.

18. The method of claim 17, wherein the activated nano porous carbon is made from polymerized furfuryl alcohol and no etching step is required.

* * * * *